3,574,785
SILOXANE COMPOSITIONS CONTAINING
TIN COMPOUNDS
Rajendra Nath Chadho, Ann Arbor, and Kailash Chandra Pande, Adrian, Mich., assignors to Stauffer-Wacker Silicone Corporation
No Drawing. Original application Sept. 2, 1965, Ser. No. 484,769, now Patent No. 3,470,221, dated Sept. 30, 1969. Divided and this application Nov. 6, 1968, Ser. No. 795,133
Int. Cl. C08g 47/00
U.S. Cl. 260—825
6 Claims

ABSTRACT OF THE DISCLOSURE

A room temperature curable silicone composition comprising a polydiorganosiloxane, an organosilicon cross-linking agent and as a catalyst a compound conforming to the formula:

$$\text{R}-\underset{\underset{\text{R}}{|}}{\overset{\overset{\text{X}}{|}}{\text{Sn}}}-\text{OR}'$$

where R is a radical selected from the group consisting of alkyl, aryl, alkaryl, alkenyl, and haloalkyl, R' is an alkyl radical of from 1 to 15 carbon atoms and X is halogen. The above room temperature curable composition is used in mold making and in the construction industry for caulking.

---

The present application is a division of application Ser. No. 484,769, filed Sept. 2, 1965 now Patent No. 3,470,221.

This invention relates to a novel class of tin compounds and to organopolysiloxane compositions incorporating such compounds.

The compounds herein were prepared with the object of providing an improved curing agent for silicone elastomers. In this connection, their most specific application has relation to compositions of the above indicated character which, with the aid of the tin compound, are adapted to cure at temperatures ranging from about 20° to 40° C. Such compositions are commonly referred to in the art as room temperature curing or vulcanizing compositions and are used for example, in mold making and in the construction industry for caulking. They are commonly laid down as from a pot or tube in a liquid or plastic condition and subsequently harden in situ to a desired solid elastic state.

A tin compound conforming to the invention is embraced by the type formula $$\text{R}-\underset{\underset{\text{R}}{|}}{\overset{\overset{\text{X}}{|}}{\text{Sn}}}-\text{OR}'$$

in which R is a hydrocarbon group e.g. alkyl, aryl, alkaryl and alkenyl, or a halo-substituted hydrocarbon group as halo-alkyl; R' is an alkyl radical of from 1–15 carbon atoms, preferably 1–8 carbon atoms; and X is halogen, preferably chlorine.

As exemplary of compounds embraced by the invention may be mentioned: dimethyltinmethoxychloride, diethyltinmethoxybromide, dibutyltinethoxyiodide, diphenyltinpentoxybromide, dipropyltinpropoxybromide, diheptyltinheptoxychloride, dibutyltinbutoxychloride, divinyltinhexoxychloride, bis 2-chlorobutyltinbutoxychloride, dibutyltinbutoxybromide and the like.

It has been determined that such compounds are readily prepared where R' contains 4 or more carbon atoms by first reacting the corresponding tin oxide viz $\text{R}_2\text{SnO}$ with the appropriate alcohol to obtain the corresponding dialkoxide:

$$\text{R}_2\text{SnO} + 2\text{HOR}' \rightarrow \text{R}_2\text{Sn}(\text{OR}')_2 + \text{H}_2\text{O}$$

This reaction is carried out at reflux temperatures in a suitable solvent using an excess of the alcohol. The water produced incident to the reaction is continuously removed. With removal of substantially all the water the reaction is considered complete. The solvent and any unreacted materials are then distilled off following which the pressure is reduced and the dialkoxide recovered by distillation.

In the above reaction, the solvent employed should have a boiling point exceeding that of the alcohol reactant or any constant-boiling alcohol-water mixture which may form (e.g. n-butanol-water mixture B.P. 920° C.

The dialkoxide produced as described is reacted with the corresponding tin dihalide ($\text{R}_2\text{SnX}_2$) to obtain the desired alkoxy monohalide:

$$\text{R}_2\text{Sn}(\text{OR}')_2 + \text{R}_2\text{SnX}_2 \rightarrow 2\text{R}_2\text{SnOR}'\text{X}$$

In this reaction equimolecular proportions of the reactants are employed. These are mixed slowly and with caution. The reaction is exothermic and some temperature control is necessary where substantial amounts of the reactants are used. A solvent is generally not employed if at least one of the reactants is a liquid. The reaction proceeds without the formation of by-products in any appreciable amount and is taken as complete when the temperature of the reaction mixture drops substantially without external cooling.

Where R' in the type formula supra contains less than four carbon atoms, the tindialkoxide may be produced, for example, by reacting a corresponding tindihalide with an alcoholate comprising R' viz:

$$\text{R}_2\text{SnX}_2 + 2\text{NaOR}' \rightarrow \text{R}_2\text{Sn}(\text{OR}')_2 + 2\text{NaX}$$

Upon removal of the salt the dialkoxide is reacted with an additional increment of the dihalide to obtain the desired alkoxyhalide.

The tin compounds of the invention as applied to catalyze room temperature curing of organopolysiloxane compositions are effective in minimal amounts e.g. 0.1 to 0.7 part by weight per 100 parts of the rubber composition. The tin compound may be added as such to the rubber material or, for convenience, it may be first incorporated in a carrier. Such carrier may be a comminuted solid or a liquid, or it may comprise both a solid component and a liquid component. As a component of the rubber material, the carrier is usually inert, but it may be functional. A typical carrier-catalyst formulation is a paste of the following composition:

|  | Parts |
|---|---|
| Methyl end-blocked siloxane fluid (2,000 cps.) | 450 |
| Tin catalyst | 75 |
| Fumed silica (thickening agent) | 125 |
| Zinc oxide (for pigmentation) | 5 |

Such a paste, by attenuating the catalyst, facilitates the mixing operation at the work site and provides latitude in that it does away with the necessity of precise measurement. Using the particular paste, 4–5 parts thereof are ordinarily added per 100 parts of base composition.

The amount of catalyst or curing agent added to the base composition is determined by the requirements of the particular job, espeically the pot life or working time required. In caulking, for example, the working time is more or les conventionally calculated as of the order of 2 or 2½ hours. Thus, in this instance the catalyst is added in an amount which will not result in any substantial stiffening of the silicone rubber until after expiration of such period of time. Normally, the rubber is tack-free within 4–6 hours following the caulking, is substantially cured after 24 hours and completely cured after 7 days. These periods, of course, vary somewhat with changes in humidity and temperature conditions. Thus a faster cure results under conditions of high temperature and high humidity.

Exemplary base compositions to which the catalyst herein have been added with excellent results are given below. The "OH Fluid" in each instance refers to an organopolysilozane having functional hydroxyl groups most of which are attached to the terminal silicon atoms as illustrated by the formula

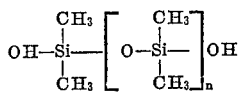

in which $n$ is an integer sufficient to yield a material having a viscosity of from about 1,700 to about 2,800 centipoises and a molecular weight of 6–8,000.

REPRESENTATIVE BASE COMPOSITIONS (I)

| | Parts |
|---|---|
| OH fluid (2,000–2,400 cps.) | 100 |
| Ethyl silicate (crosslinker) | 6 |
| Iron oxide (reinforcing agent) | 60–75 |

(II)

| | |
|---|---|
| OH fluid (2,500–2,900 cps.) | 100 |
| Ethyl silicate | 4 |
| Iron oxide | 75 |
| Hydrogenated castor oil (thixotropic agent) | 9 |

(III)

| | |
|---|---|
| OH fluid (2,000–2,400 cps.) | 100 |
| Ethyl silicate | 4 |
| 5 micron silica (reinforcing agent) | 65 |
| Zinc oxide (pigmenting and reinforcing agent) | 10 |

It is to be understood that this invention herein is not limited in use to hydroxy end-blocked organopolysiloxanes, for it is applicable to any organosiloxane composition in which the organosiloxane is capable of polymerizing or condensing at a temperature of 20–40° C. to yield an elastomeric or neo-elastomeric substance. Silicone rubber room temperature vulcanizing stocks conform, in general, to the formula $XOR_2SiO(R_2SiO)_nSiR_2OX$ where each R represents either a monovalent hydrocarbon radical such as alkyl, aryl, alkenyl, alkaryl, aralkyl or cycloalkyl, or a halogenated monovalent hydrocarbon radical as chloro-, bromo- or fluoroalkyl, aryl or alkenyl, X is hydrogen atom or any of R, preferably hydrogen, and $n$ is an integer of at least 50. The operative polymers vary from relatively low viscosity fluids to high polymeric gums soluble in organic solvents. These materials are primarily difunctional, but mono- and trifunctional components may be present in an amount minor in relation to the amount of difunctional units.

Organic radicals answering to R in the immediately preceding type formula include: methyl, ethyl, octadecyl, phenyl, diphenyl, anthracyl, tolyl, xylyl, ethylphenyl, methylnaphthyl, benzyl, phenylethyl, cyclopropyl, cyclobutyl, cyclohexenyl, vinyl, allyl and octadecenyl as well as halogen substituted derivatives of such radicals including chloromethyl, bromomethyl, fluoromethyl, perchloroethyl, chlorofluoroethyl, bromophenyl, 3,3,3-trifluoropropyl, α,α,α-trichlorotolyl, chlorobenzyl, chlorodifluorovinyl, and chloroallyl.

The siloxane polymers can be homopolymers, such as hydroxy end-blocked dimethylpolysiloxane mentioned supra, or copolymers as hydroxy and alkoxy end-blocked dimethyl-phenylmethylsiloxane copolymers or mixtures thereof.

Cross-linking agents applicable to compositions incorporating the catalyst of the invention are, in general, organosilicon compounds having more than two functional groups and conforming to the general structural formula $R_mSiX_{4-m}$ where R has the same significance as in the formula $XOR_2SiO(R_2SiO)_nSiR_2OX$ appearing above, each X is a reactive group capable of condensation with the XO— substituents in the siloxane and $m$ has an average value of from 0 to 2. Likewise applicable, are the corresponding siloxanes.

As exemplary of specific cross-linking agents which may be used in the practice of the invention may be mentioned: (a) silanes such as triethoxysilane, methyl triethoxy silane and phenyl-tributoxysilane, (b) siloxanes such as dimethyl-tetraethoxydisiloxane and dimethyl-diphenyl hexaethoxytetrasilaxane, (c) organopolysiloxane resins containing monomethyl, dimethyl and monophenyl units, (d) organo-hydrogen-polysilozanes of the formula

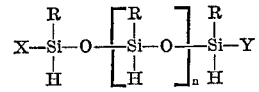

in which R is normally methyl or phenyl and X and Y are reactive groups as hydroxyl or $OSi(CH_3)_3$ or the like. These latter compounds meet the requirement of polyfunctionality, since hydrogen is taken as a functional group.

The cross-linking agent may also be (e) a polyalkyl silicate (note ethyl silicate int he formulations supra) or (f) products derived from silicic acid and containing reactive groups, as hydroxy or alkoxy groups bound to silicon atoms. Silicic acid obtained by hydrolyzing trichlorosilane is applicable as is silicic acid esterified with an alcohol to form alkoxylated silicic acids.

The invention is further illustrated by the following examples which are not to be taken as in anyway limitative thereof.

EXAMPLE I

Bu₂SnO (264.3 gms.) an n-butanol (four-fold excess) in toluene (1500 ml.) were refluxed under constant stirring. As soon as the reaction mixture started refluxing, water was formed and continuously collected through a Dean Stark take-off head. In about 4–6 hours, almost all the water was collected. The toluene was then distilled off and the unreacted n-butanol was also recovered. Thereafter the reaction product was distilled under reduced pressure to obtain dibutyltindibutoxide (yield=60%, B.P.= 130°–135° C., @ 4 mm. pressure).

8.8 gms. of the dibutyltindibutoxide was cautiously mixed with 7.2 gms. of dibutyltindichloride in the absence of a solvent. Heat was evolved and in about 10–15 minutes a low melting solid, dibutyltinbutoxychloride, was obtained in almost quantitative yield.

7 gms. of the dibutyltindibutoxide was slowly and carefully mixed with 8 gms. of dibutyltindibromide. Again, heat was evolved and a low melting solid product, dibutyltinbutoxybromide, was obtained.

EXAMPLE II

The procedure of Example I is repeated starting with diheptyltinoxide in lieu of dibutyltinoxide and n-heptanol instead of n-butanol. This gives diheptyltindiheptoxide which on reaction with diheptyltindichloride yields diheptyltinheptoxychloride.

EXAMPLE III

The procedure of Example I is repeated starting with diphenyltinoxide which is reacted with n-amyl alcohol to produce diphenyltindipentoxide. Reaction of the latter with diphenyltindibromide yields diphenyltinpentoxybromide.

EXAMPLE IV

The procedure of Example I is repeated starting with divinyltinoxide in place of dibutyltinoxide and using n-hexanol as the alcohol. This gives divinyltindihexoxide which on reaction with dihexyltindichloride yields divinyltinhexoxychloride.

EXAMPLE V

A base composition designed for caulking was prepared as follows:

| | Parts by weight |
|---|---|
| Hydroxy end-blocked fluid | 10 |
| Ethyl silicate | 1 |
| Silica filler | 5.6 |

To one portion of the base composition was added .2 part by weight of the dibutyltinbutoxychloride. The cured the rubber to a tack-free condition in about 2 hours, as calculated.

To a second portion of the base composition was added .2 part by weight of the dibutyltinbutoxybromide. The cure to a satisfactory tack-free rubber required about one-half hour longer than in the case of the corresponding chloride catalyst.

This example is particularly significant in that it shows that the butoxy-halides are capable of providing a cure period of selected duration. The control of cure time is a function of the relatively bulky and non-hydrolyzable halo group which tends to slow the rate of hydrolysis of the single alkoxy group. Assuming constant conditions, to extend the cure period it is only necessary to use lesser amounts of the catalyst. Conversely, for a faster cure a greater quantity of the catalyst is employed. In any case, one should take into account that as between the halides, the chloride acts faster than the bromide and the latter faster than the iodide, for instance.

EXAMPLE VI

An apparatus consisting of a 1 liter flask, dropping funnel, nitrogen inlet, condenser, stirrer and thermometer was set up, all of this equipment having been previously completely cleaned and dried. 100.2 grams of dry ethyl alcohol was placed in the flask along with 26 grams of cut metallic sodium, added slowly and with care. With some of the sodium already reacted, 100.2 additional grams of dry ethyl alcohol was introduced with stirring and heating. A good sodium dispersion resulted and with further heating to reflux complete solution was achieved with formation of $NaOC_2H_5$.

148.2 grams of dibutyltindichloride dissolved in benzene was slowly added to the alcoholate over a period of approximately 1 hour. When addition was complete the mixture was maintained at reflux temperatures for about 6 hours, whereafter it was allowed to cool and settle under a dry nitrogen atmosphere. To remove the salt precipitate the reacted mixture was filtered under nitrogen, first through a Buchner funnel, then through a fine sintered glass funnel. The clear solution was distilled to remove solvent, leaving a clear liquid having a dark wine color. When this was distilled under vacuum (1 mm.) the fraction boiling at 136° C. proved to be dibutyltindiethoxide.

When reacted in equimolecular ratio with a second portion of dibutyltindichloride the diethoxide yields dibutyltinethoxychloride which acts in the manner of the compounds above to catalyze the curing of organopolysiloxane systems.

Incident to the experimentation culminating in the present application, dialkyltindialkoxides, including dibutyltindibutoxide, were investigated for their effectiveness as curing catalysts in siloxane compositions. It was found that when used in amounts required for a complete cure the dialkoxides worked so fast as to be impractical. Differently stated, it was discovered that when the amount of the dialkoxide was reduced to the point where the catalytic action ceased at the end of a period corresponding to an optimum cure period the tensile strength, elongation at break, hardness, and other properties of the silicone rubber were adversely affected for lack of a complete cure. With the compounds of the invention, a complete cure can be achieved at a curing rate which is optimum in the case of any particular fiield of use.

The presence of moisture, normally atmospheric moisture, has been determined as essential to proper curing of a siloxane composition conforming to the invention. Thus, a silicone rubber formulation comprising one of the alkoxy halides will not cure within any practical period if completely protected from moisture. It is evident from the findings on which this application is based that the catalyst by virtue of the ambient moisture is enabled to generate —OH groups which provide the catalytic effect on becoming directly attached to the tin. As indicated in the last paragraph of Example V, the speed of generation of such groups is a function of the halide portion of the molecule which in a sense slows down the rate of hydrolysis of the more reactive alkoxy radical. It is believed that the mechanism of the hydrolysis is as illustrated below, with overlapping of the two reactions:

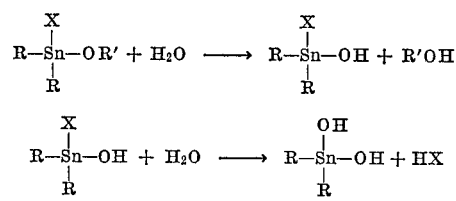

The invention claimed is:

1. A silicone rubber composition adapted to cure at room temperature, comprising a substantially linear organopolysiloxane of the formula $$XOR_2SiO(R_2SiO)_nSiR_2OX$$

wherein R is selected from the group consisting of monovalent hydrocarbon radicals and halogenated monovalent hydrocarbon radicals; X is selected from the group consisting of hydrogen and R above and $n$ is an integer of at least 50; an organosilicon cross-linking agent having at least two functional groups selected from the group consisting of (a) $R_mSiX_{4-m}$ wherein R is selected from the group consisting of monovalent hydrocarbon and moonvalent halogenated hydrocarbon radicals, each X is a reactive group capable of condensation with the XO- substituents of the above-defined organopolysiloxane and $m$ has an average value of from 0 to 2, (b) disiloxanes, (c) organopolysiloxane resins containing monomethyl, dimethyl and monophenyl groups, (d) organo-hydrogenpolysiloxanes, (e) polyalkyl silicates and (f) alkoxylated silicic acids and a catalytic quantity of a compound conforming to the formula

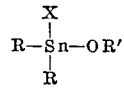

where R is a radical selected from the group consisting of alkyl, aryl, alkaryl, alkenyl and haloalkyl, R′ is an alkyl radical of from 1 to 15 carbon atoms and X is halogen.

2. The silicone rubber composition of claim 1 wherein the catalitic compound is dibutyltinbutoxychloride.

3. The silicone rubber composition of claim 1 wherein the catalytic compound is dibutyltinbutoxybromide.

4. The silicone rubber composition of claim 1 wherein the catalytic compound is dibutyltinethoxychloride.

5. The silicone rubber composition of claim 1 wherein the catalytic compound having at least one group selected from the class consisting of OR' and X which is capable in the presence of moisture of becoming converted to —OH.

6. The silicone rubber composition of claim 1, which contains a filler.

References Cited
UNITED STATES PATENTS 3,365,479   1/1968   Le Fort _____ 260—429.7

DONALD E. CZAJA, Primary Examiner

M. I. MARQUIS, Assistant Examiner

U.S. Cl. X.R.

260—37, 465, 429.7